United States Patent
Carthy et al.

(10) Patent No.: US 9,856,624 B2
(45) Date of Patent: Jan. 2, 2018

(54) WELDED COMPONENT AND METHOD OF FABRICATION

(71) Applicant: JC BAMFORD EXCAVATORS LIMITED, Uttoxeter, Staffordshire (GB)

(72) Inventors: Mark Carthy, Uttoxeter (GB); Dave Hurdman, Uttoxeter (GB)

(73) Assignee: J.C. BAMFORD EXCAVATORS LIMITED, Uttoxeter (GB)

(*) Notice: Subject to any disclaimer, the term of this patent is extended or adjusted under 35 U.S.C. 154(b) by 73 days.

(21) Appl. No.: 14/481,724

(22) Filed: Sep. 9, 2014

(65) Prior Publication Data
US 2015/0071752 A1 Mar. 12, 2015

(30) Foreign Application Priority Data
Sep. 10, 2013 (GB) .................... 1316070.0

(51) Int. Cl.
| | | |
|---|---|---|
| *E02F 3/38* | (2006.01) | |
| *B23K 33/00* | (2006.01) | |
| *B23K 31/02* | (2006.01) | |
| *B23K 37/08* | (2006.01) | |
| *B23K 9/00* | (2006.01) | |
| *B23K 9/025* | (2006.01) | |
| *B23K 9/167* | (2006.01) | |
| *B23K 9/173* | (2006.01) | |
(Continued)

(52) U.S. Cl.
CPC .............. *E02F 3/38* (2013.01); *B23K 9/0026* (2013.01); *B23K 9/025* (2013.01); *B23K 9/167* (2013.01); *B23K 9/173* (2013.01); *B23K 9/23* (2013.01); *B23K 31/02* (2013.01); *B23K 33/008* (2013.01); *B23K 37/08* (2013.01); *B23K 2203/04* (2013.01)

(58) Field of Classification Search
CPC .. E02F 3/38; B23K 9/23; B23K 9/167; B23K 9/025; B23K 9/0026; B23K 9/173; B23K 37/08; B23K 33/008; B23K 2203/04
See application file for complete search history.

(56) References Cited

U.S. PATENT DOCUMENTS

| 4,392,314 A | 7/1983 | Albrecht et al. | |
|---|---|---|---|
| 9,255,378 B2 * | 2/2016 | Sugaya | E02F 3/38 |

(Continued)

FOREIGN PATENT DOCUMENTS

| JP | 2001-123471 A | 5/2001 |
|---|---|---|
| JP | 2004-092210 A | 3/2004 |

(Continued)

OTHER PUBLICATIONS

European Search Report for Application No. EP14184019.9, dated Jan. 20, 2015.

(Continued)

*Primary Examiner* — Jacob Cigna
(74) *Attorney, Agent, or Firm* — Marshall, Gerstein & Borun LLP

(57) ABSTRACT

A box-section arm of an excavator or the like has a pivot axis at one side. Two flat plates 25, 26 close the underside of the box-section adjacent the pivot axis, and are welded transversely from a pair of projections 28, 29 at one side, to corresponding pair of projections 28, 29 at the other side. The projections 28, 29 are partially but not wholly removed after welding.

12 Claims, 2 Drawing Sheets

(51) Int. Cl.
*B23K 9/23* (2006.01)
*B23K 103/04* (2006.01)

(56) References Cited

U.S. PATENT DOCUMENTS

2013/0343854 A1* 12/2013 Sugaya .................... E02F 3/38
414/727
2014/0010624 A1    1/2014 Sugaya et al.

FOREIGN PATENT DOCUMENTS

JP        2013-147794 A    8/2013
WO    WO-2012/157675 A1    11/2012

OTHER PUBLICATIONS

Search Report for GB 1316070.0, dated Feb. 17, 2014.
First Office Action received in Chinese Application No. 201410459231.9, dated Aug. 9, 2017.

* cited by examiner

WELDED COMPONENT AND METHOD OF FABRICATION

SUMMARY OF THE INVENTION

This invention relates to a welded component, in particular a deposition welded, hollow steel fabrication for an articulating arm of an excavator, and a method of fabrication thereof.

BACKGROUND OF THE INVENTION

Steel fabrications are often employed in the manufacture of components for construction equipment and the like. In the case of an arm for lifting or loading, a fabrication may consist of a somewhat rectangular box section incorporating a pivot and comprising a plurality of substantially flat plates connected together by welding; such an arm can be both strong and of low mass and low inertia.

Care is required during welding to avoid the introduction or creation of concentrations of stress, which may result in failure of the weld in use. In particular high stresses can be produced at the start or at the end of an electro-deposition weld, for example where two plates are joined together by a transverse weld.

In such circumstances, it is conventional to provide a run-on and run-off feature at the end of the joint to be welded, generally in the form of a plate extension or protuberance. The weld is started and stopped on the projection which is at either end of the weld run, and this ensures that over the length of the substantive joint the weld is of substantially consistent quality.

After completion of the weld, the run-on and run-off features, together with the start and end of the deposition weld, are removed by grinding to leave only the welded joint flush with the longitudinal edge of the respective plates. In this way any potential weld defect is removed from the start and stop positions, and a consistently strong fabrication is thus provided.

Nevertheless it would be desirable to further reduce the stress levels at the start and end of such a deposition weld, in particular in the region of a pivot of a box section fabrication.

SUMMARY OF THE INVENTION

According to the invention there is provided a method of fabricating a box section arm for an excavator, said arm defining a transverse pivot axis between the ends thereof, one side of said arm comprising substantially flat plate members meeting at a transverse plane coincident with said axis, and each plate member including opposite transverse projections at the mutually adjacent ends, the method comprising:
 transversely welding said plate members together, said weld commencing at the projections at one side, and finishing at the projections at the opposite side, and
  partially removing the projections and weld at both sides.

Such a fabricated arm has reduced stress at each end of the transverse weld bead, and provides for an improved connection in the region of a pivot of the arm. It has been found that the number of fatigue cycles before failure is substantially increased by the invention, typically by 50-100%.

The projections are preferably located at edges at the mutually adjacent ends of the plate members, for example at side edges of the box section arm. The projections preferably extend from a side edge of the plate members, most preferably at the mutually adjacent ends of the plate members. The projections may project in a direction parallel to the said transverse pivot axis and preferably project only in that direction. Each projection is preferably flush with the plate from which it projects.

Continuous deposition welding is preferred, and the gap between the plates is preferably an open "V" in order to accommodate the deposition weld bead.

The pivot axis may be defined by an annular casting to be welded along a peripheral edge to the sides of the arm, and to the flat plate members. Such a casting may define the pivot axis in a through bore, and one such casting is generally provided at each side of the box section, so that each casting is welded to both of the flat plate members, and the flat plate members are welded to each other.

In another aspect the invention provides an arm for an excavator fabricated by the method of the invention, and an excavator fitted with such an arm. The fabricated arm of the invention may be used on other kinds of machinery having similarly pivoted arms.

BRIEF DESCRIPTION OF THE DRAWINGS

Other features of the invention will be apparent from the following description of a preferred embodiment illustrated by way of example only in the accompanying drawings, in which.

DETAILED DESCRIPTION

Figure 1:
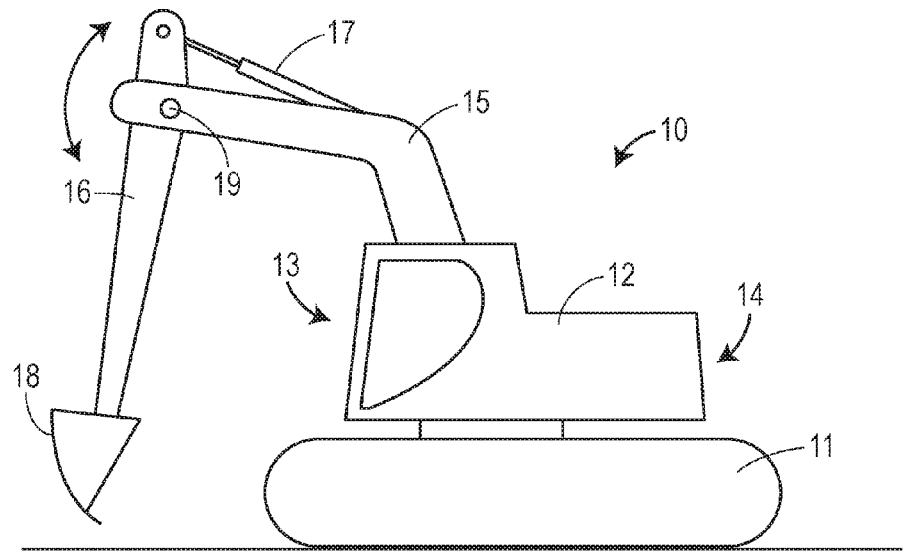
FIG. 1 illustrates in side elevation an excavator.

With reference to FIG. 1, a conventional excavator 10 comprises a tracked chassis 11 on which is provided a body 12 comprising a driver cab 13 and an engine 14. A first arm 15 extends forwards from the body and supports thereon a second pivoting arm 16. A hydraulic strut 17 controls pivoting of the arm 16, which carries at the free end a shovel 18. Many features of the excavator are omitted, in particular the first arm 15 may pivot up and down with respect to the body 12, and the shovel 18 may pivot with respect to the second arm 16. The first and second arms are connected at pivot axis 19.

Figure 2:
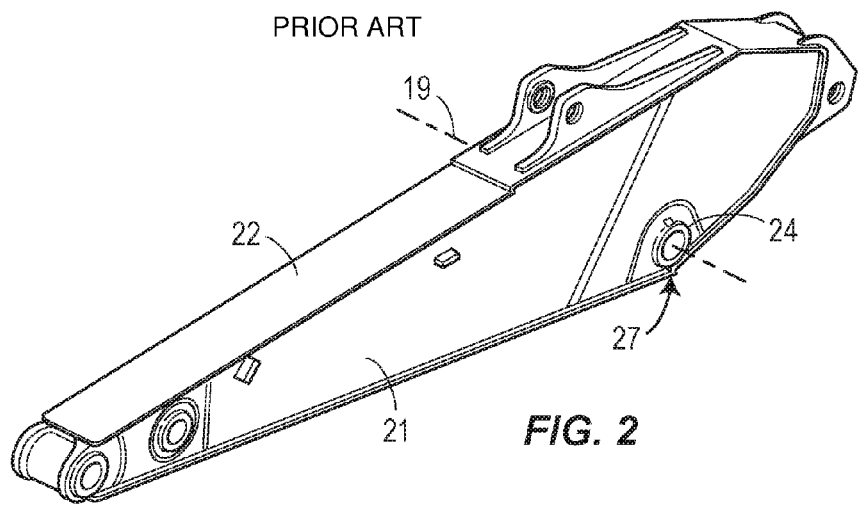
FIG. 2 is a perspective view from one side and above, of an excavator arm incorporating the invention, FIG. 3 corresponds to FIG. 2, and shows the excavator arm from one side and below.
Figure 3:
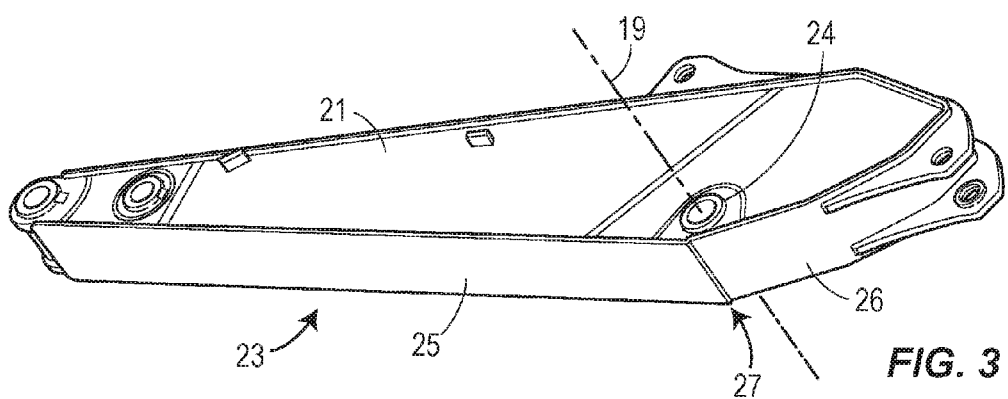

The second arm is illustrated in more detail in FIGS. 2 and 3, and comprises a box-section comprising two side plates 21, a top 22 and a underside 23. A typical second arm has a length in the range of 1.9 to 3.0 m, but could be up to 6 m long. The width and height of the arm in the region of the pivot axis is around 300 mm, but could be less or more. As illustrated the arm tapers towards the ends thereof, but is typically of substantially constant width.

The pivot axis 19 is defined by a pair of pivot castings 24 which are welded in corresponding recesses of the side plates 21. The underside 23 is constituted by two plate members 25, 26 extending on either side of the axis 19. As can be seen from FIG. 3, these plate members meet transversely underneath the castings 24 (as viewed), and must be welded together at this interface as well as to the side plates and pivot castings. The flat plate have an obtuse included angle, as illustrated.

Figures 4, 5:
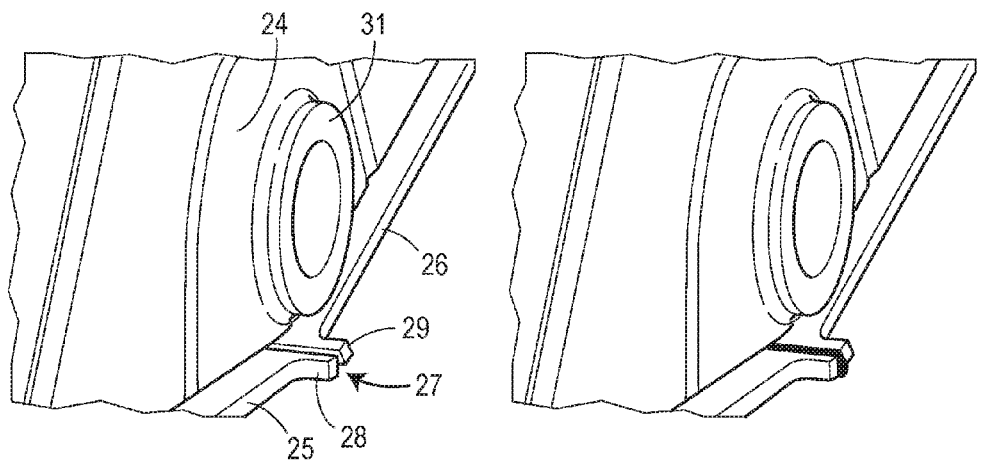
FIG. 4 is an enlarged partial perspective of a conventional weld projection prior to welding.
FIG. 5 is an enlarged partial perspective view of the invention after welding and finishing, FIG. 6 corresponds to FIG. 4 and shows conventional finishing of a welded joint, FIG. 7 corresponds to FIG. 4 and shows the excavator arm from below, prior to transverse welding, FIG. 8 corresponds to FIG. 5 and shows the excavator of the invention arm from below, after transverse welding and finishing.

FIG. 4 illustrates one side of the arm 16 in more detail and shows a pivot casting 24 and the two plate members 25, 26. Each pivot casting 24 has a circular boss 31. The interface comprises a "V" shaped slot 27 formed by a chamfer at the end of each of the plate members 25, 26. As is well understood, such a slot is suitable for deposition welding, for example by electric arc, MIG or TIG welding apparatus.

At each end of the transverse slot 27, the plates 25, 26 define a respective projection or tab 28, 29 which constitute a starting and a stopping surface for the deposition weld. Each projection projects about 25 mm prior to welding.

Figure 6:
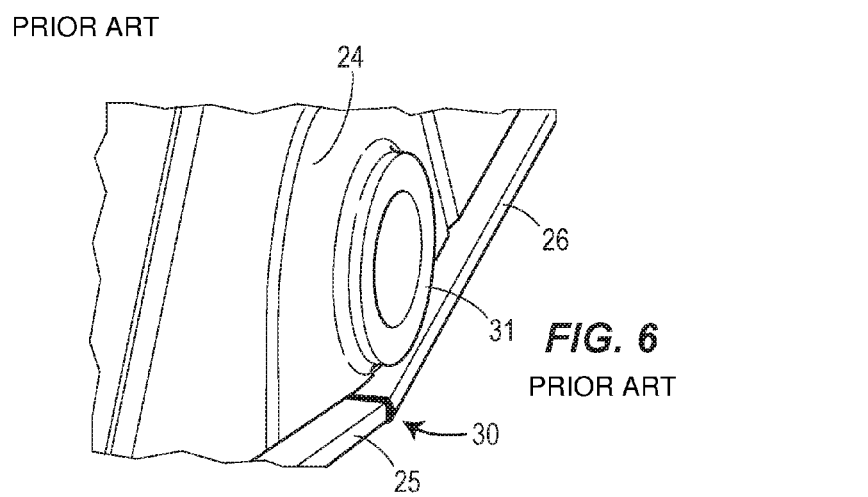

Conventionally, after welding is completed, such projections are completely removed along with the corresponding weld bead to leave a flush finish, as illustrated in FIG. 6, in which the weld bead 30 is shown.

Figures 7, 8:
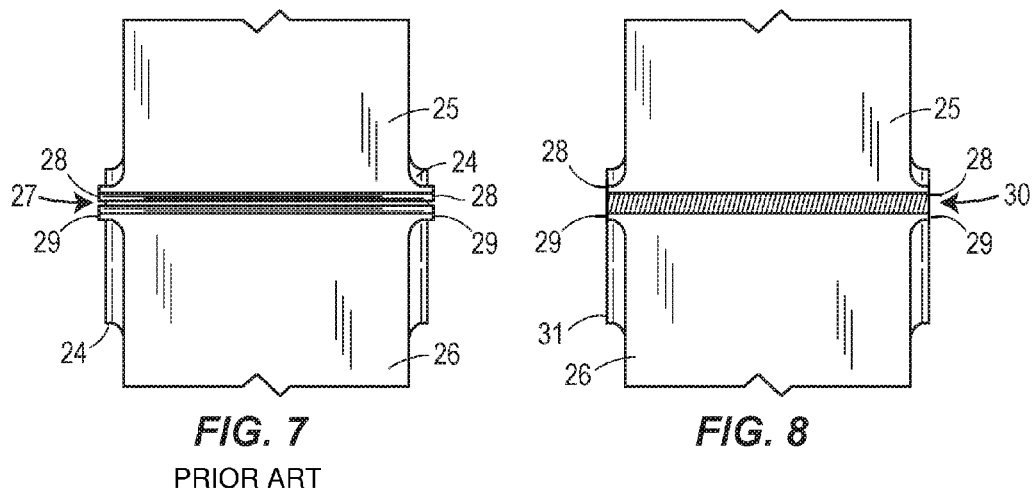

FIG. 7 illustrates the conventional arrangement from the underside prior to welding. The projections 28, 29 can be clearly seen at either end of the slot 27.

The invention is illustrated in FIGS. 5 and 8. After welding the projections 28, 29 are partially removed along with the corresponding weld bead. As seen in FIG. 8, the remaining projection does not extend beyond the boss 31 provided on each pivot casting 24. The projections may be reduced in any convenient manner, for example by grinding, prior to anti corrosion treatment and painting.

The method of fabrication comprises placing the two pivot castings 24 in a jig with the sides top and bottom of the excavator arm, and tack welding of the components prior to seam welding. The plate components of the arm are typically of steel having a thickness in the range 4-8 mm. After welding the projections and associated portions of weld are removed by grinding, so that for example 10-20 mm of projection is removed from either end of the weld, and 5-15 mm of the projection remains. In one embodiment a 25 mm projection is reduced to 10 mm.

The invention claimed is:

1. A method of fabricating a box section arm for an excavator, said arm defining a transverse pivot axis between the ends thereof, one side of said arm comprising substantially flat plate members meeting at a transverse plane coincident with said axis, and each plate member including opposite transverse projections at the mutually adjacent ends, the method comprising:

transversely welding said plate members together, said weld commencing at the projections at one side, and finishing at the projections at the opposite side, partially removing the projections and weld at both sides, and applying an anti-corrosion treatment to the partially removed projections and weld.

2. The method of claim 1 wherein the step of transversely welding is by continuous deposition weld.

3. The method of claim 1 including the preparatory step of chamfering the adjacent ends of the plate members to provide a "V" shaped slot for the transverse weld.

4. The method according to claim 1 wherein said projections are reduced in length by about 50-75%.

5. The method of claim 1 wherein said projections are reduced in length by 10-20 mm.

6. The method of claim 1 wherein said projections project by 5-15 mm after said partial removal thereof.

7. The method of claim 1 wherein the step of partial removal is by grinding.

8. The method of claim 1 wherein the step of applying an anti-corrosion treatment comprises applying paint to the partially removed projections and weld.

9. The method of claim 1, wherein the step of partially removing the projections and weld at both sides comprises only partially removing the projections and weld at both sides.

10. The method of claim 1 wherein said pivot axis is defined by a annular bearing at either side of said arm, the bearings bridging said plate members, the method including the step of welding said bearings to said plate members.

11. The method of claim 10 wherein said axis is positioned to one side of said arm immediately adjacent said plate members.

12. The method of claim 10 wherein said annular bearings each comprise an externally facing circular boss coaxial about said axis, and said projections are removed so as to project less than each respective boss.

* * * * *